R. C. Hussey,

Leather Cutting Board,

No. 2,496. Reissued Feb. 26, 1867.

Witnesses.

Jos. A. Service

J. W. B. Covington

Inventor.

R. C. Hussey

Per Munn & Co

Attorneys

N. PETERS, PHOTO-LITHOGRAPHER, WASHINGTON, D. C.

United States Patent Office.

ROLAND C. HUSSEY, OF MILFORD, MASSACHUSETTS.

*Letters Patent No.* 57,513, *dated August* 28, 1866; *reissue No.* 2,496, *dated February* 27, 1867.

IMPROVED CUTTING-BOARD.

The Schedule referred to in these Letters Patent and making part of the same.

TO ALL WHOM IT MAY CONCERN:

Be it known that I, ROLAND C. HUSSEY, of Milford, in the county of Worcester, and State of Massachusetts, have invented a new and improved Cutting-Board; and I do hereby declare that the following is a full, clear, and exact description thereof, which will enable others skilled in the art to make and use the same, reference being had to the accompanying drawings, forming part of this specification, in which—

Similar letters of reference indicate like parts.

The object of my invention is to produce a good and durable cutting-board, one on which to lay out and cut leather in the manufacture of boots and shoes, and which will not admit of the knife being deflected or drawn out of its proper course, a contingency of frequent occurrence in using the ordinary cutting-boards, on account of the knife having a tendency to follow the grain of the wood, and which frequently damages the stock or spoils the work.

My invention consists, first, in constructing a cutting-board of a plurality of wooden strips or pieces glued or otherwise connected in such a manner that the end of the grain of the wooden strips or pieces will form the face side of the board or the surface on which the leather or stock is cut, and obviate the difficulty above alluded to.

My invention consists, second, in forming the cutting-board of separate or distinct sections secured together by a clamp in order to facilitate the construction of the board and adapt the size of the same to the work required to be done.

My invention consists, third, in the means I employ for clamping several sections together so as to produce a board of any given size.

Figure 1:
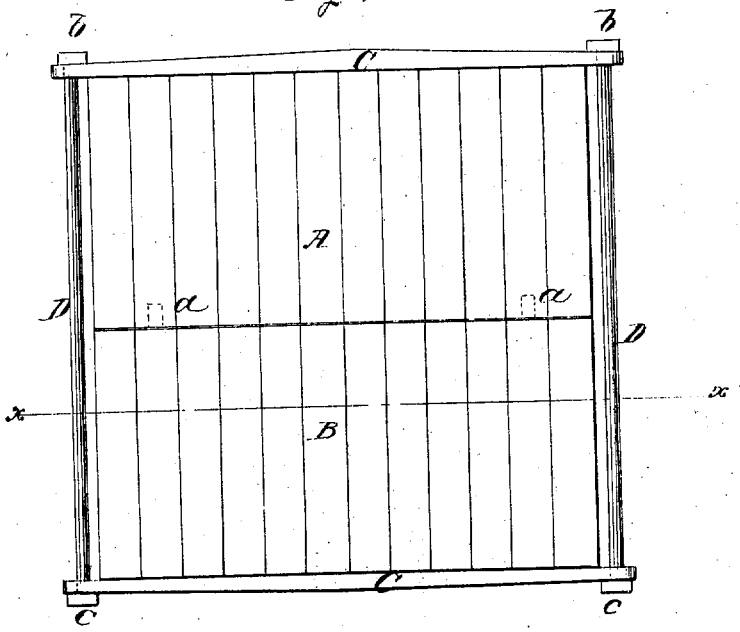
Figure 1 is a plan or top view of two sections of a cutting-board made and bound together according to my invention.
Figure 2:
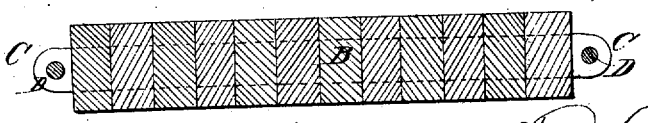
Figure 2 is a cross-section taken on the line *x x*, fig. 1.

A and B designate two separate sections of a cutting-board, and each section is composed of several blocks evenly trimmed, or placed and secured together with the ends uppermost. In preparing the stock for use I have found it expedient to proceed as follows: The stock is first cut up into blocks of the desired size; these are placed on racks in a room which is a little damp, where it remains from one to three months; the blocks are then removed and placed in a room of the ordinary temperature, say about 50° Fahrenheit, where they will gradually dry, a month or six weeks being allowed for the purpose. They are then removed and placed in a hotter room, the temperature being at about 100° Fahrenheit, where they are allowed to remain about a fortnight. After the blocks have been thus seasoned, they are planed true and glued together so as to form sections as illustrated by A B. These sections are then planed off true upon each side, and two or three or more, according to the size of cutting-board required, are jointed, bored, and dowelled, as shown at *a a*, fig. 1. They are then clamped together, and the board is in the proper shape for the cutting room of a boot and shoe manufactory. The clamping device consists of two bars C, of metal or wood, of the proper length to stretch across one side of the board. Through their ends holes are made, and through them run rods D, having heads *b* on the one end, and nuts *c* on the other, by which to tighten them and lock up the frame so as to hold the sections firmly and closely together.

I am aware that blocks, logs, etc., with the end uppermost, have been used for cutting and chopping-blocks, but these have nothing to do with my invention. I believe myself to be the first who has successfully seasoned the blocks, before uniting them, so that they will stand the heat of a boot manufactory, and also the moisture of the leather, without either warping, cracking, or being otherwise injured. By clamping together two or more sections I form a large board on which the workman can cut out his work, and, if at any time he desires a smaller one, merely a section, the clamping-rods can be readily removed. Also, this manner of clamping the sections together provides a ready means for separating them so that they can be planed off true by machinery after they have become cut up.

Having thus described my invention, I claim as new, and desire to secure by Letters Patent—

The sections A and B, constructed of a series of seasoned strips firmly glued or cemented to each other, in combination with the clamping device consisting of rods D, bars C, and nuts *c*, for the purpose described substantially as specified.

ROLAND C. HUSSEY.

Witnesses:

J. R. PIERCE,

GEO. G. PARKER.